Patented May 8, 1945

2,375,628

UNITED STATES PATENT OFFICE 2,375,628

METHOD OF PREPARING DERIVATIVES OF MORPHOLINE AND THIAMORPHOLINE

Gaetano F. D'Alelio and James J. Pyle, Pittsfield, Mass., assignors to General Electric Company, a corporation of New York No Drawing. Application June 2, 1943,
Serial No. 489,384

9 Claims. (Cl. 260—247)

This invention relates to the preparation of derivatives of morpholine and thiamorpholine which may be represented graphically by the following general formula:

I 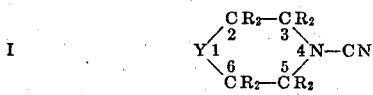

where Y is a member of the class consisting of oxygen and sulfur, and R is a member of the class consisting of hydrogen and monovalent hydrocarbon radicals. Illustrative examples of monovalent hydrocarbon radicals that R in the formula may represent are: aliphatic (e. g., methyl, ethyl, propyl, isopropyl, allyl, butyl, sec.-butyl, isobutyl, butenyl, amyl, isoamyl, hexyl, etc.) including cycloalihatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, etc.); and aryl-substituted aliphatic (e. g., benzyl, phenylethyl, phenylpropyl, cinnamyl, etc.). Preferably R represents hydrogen.

Although compounds such, for instance, as beta-N-morpholino-propionitrile and gamma-N-morpholino-butyronitrile are known, the compounds resulting from the methods of the present invention are distinguished from such known compounds by the fact that the cyano group is attached directly to the nitrogen atom of the morpholine ring.

The N-cyano compounds embraced by Formula I may be used as chemo-therapeutic agents and, also, as intermediates in the preparation of derivatives thereof such, for instance, as carbamyl, thiocarbamyl, imido ether, amidine, acyl, ureido, hydrazino, etc., derivatives of the individual morpholines or thiamorpholines embraced by Formula I. Various derivatives of such chemical compounds also may be used as chemotherapeutic agents. These N-cyanomorpholines and N-cyanothiamorpholines and certain derivatives thereof are especially valuable in their use as plasticizers for aminoplasts (e. g., urea-formaldehyde resins, melamine-formaldehyde resins, etc.) and other resinous bodies and molding compounds produced therefrom that have unsatisfactory plasticity or flow characteristics, including resins of the acrylonitrile an methacrylonitrile type and other thermoplastic resins. Aldehyde reactable derivatives of the compounds embraced by Formula I, e. g., N-carbamyl and N-thiocarbamyl morpholines and thiamorpholines, may be condensed with, for instance, aldehydes, including polymeric aldehydes and aldehyde-addition products, to yield condensation products having particular utility in the plastics and coating arts.

In practicing our invention we prepare compounds of the kind embraced by Formula I by effecting reaction between (1) a morpholine or a thiamorpholine that is unsubstituted in the $N^4$ position and which corresponds to the general formula II 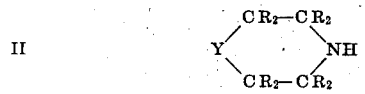

where Y and R have the same meanings as given above with reference to Formula I, and (2) a cyanogen halide (cyanogen chloride, cyanogen bromide, cyanogen fluoride, cyanogen iodide), the said reaction preferably being effected in the presence of a hydrohalide acceptor. Illustrative examples or morpholines and thiamorpholines that may be used, depending upon the particular end product desired, are listed below. It will be noted that this list includes examples of morpholines and thiamorpholines having various hydrocarbon substituents, including alkyl, alkenyl, cycloalkyl, aryl, alkaryl and aralkyl substituent groupings, attached to one or more carbon atoms of the morpholine nucleus.

Morpholine
Thiamorpholine
2-methylmorpholine
3-ethylmorpholine
3-propylmorpholine
3,5-dimethylmorpholine
2,6-dimethylmorpholine
2-methyl 5-isopropyl morpholine
2-methyl 5-isobutyl thiamorpholine
3-propylthiamorpholine
3-allyl 6-butyl thiamorpholine
3,3-dimethylmorpholine
2-ethyl 5-butenyl thiamorpholine
2-amyl 3-hexyl 6-butenyl thiamorpholine
2-isopropyl 3-methyl 6-butyl thiamorpholine
2,3,5-trimethylmorpholine 2,3,5,6-tetraethylmorpholine
3-methyl 5-phenyl morpholine
3-allyl 5-cyclohexyl 6-phenyl morpholine
2-xenyl 6,6-ditolyl thiamorpholine
2,2,3,3,5,5,6,6-octaethylmorpholine
2-cinnamyl 3-methyl 5-cycloheptyl 6-phenyl morpholine
3-cyclohexylmorpholine
2-ethylphenyl 3-benzyl 6-tolyl morpholine
3-phenethyl 5-propyl 6,6-dimethyl thiamorpholine
2-allyl 5-isoamyl 6-naphthyl thiamorpholine
2-allylphenyl 5-isoamyl 6-phenyl morpholine
2-allyl 5,5-dicyclohexyl 6-tolyl morpholine
3-phenylpropyl 6-cinamyl morpholine
2,2-diphenyl 5-tolyl 6-allylphenyl thiamorpholine
2-phenylmorpholine
2,2-dibenzyl 3-allylphenyl 5-propylphenyl morpholine
2-methyl 3-ethyl 5-propyl 6-butyl morpholine
2,2-dimethyl 3,3-diethyl 5,5-dipropyl, 6,6-dibutyl thiamorpholine
2,2-diethyl 3,3-diphenyl 5,5-dicyclohexyl 6,6-dipropyl morpholine
3-naphthylmorpholine
5-xenylthiamorpholine Illustrative examples of hydrohalide acceptors that may be used are the inorganic bases, e. g., the alkali-metal hydroxides (sodium hydroxide, potassium hydroxide, etc.), calcium hydroxide, barium hydroxide, strontium hydroxide, etc., the carbonates of such bases, and the organic bases, for instance trimethyl amine, tributyl amine, dimethyl aniline, pyridine, quinoline, a morpholine or a thiamorpholine (numerous examples of which have been given above), etc., quaternary ammonium bases (e. g., tetramethyl ammonium hydroxide, etc.), and the like. We prefer to use an excess of the morpholine or thiamorpholine reactant as the hydrohalide acceptor.

For economic reasons and because of their availability we prefer to employ cyanogen bromide or cyanogen chloride as the cyanogen halide reactant.

The reaction between the morpholine (or thiamorpholine) and the cyanogen halide may be carried out in any suitable manner, but preferably is effected in the presence of a suitable solvent or mixture of solvents. Although various solvents or solvent mixtures may be employed, we prefer to use petroleum ether or diethyl ether. However, other solvents including water may be employed instead of the organic solvents just mentioned. The reaction may be carried out under a variety of temperature and pressure conditions, for instance at normal or at elevated temperatures and at atmospheric, subatmospheric or super-atmospheric pressures.

The above reaction may be represented by the following equation:

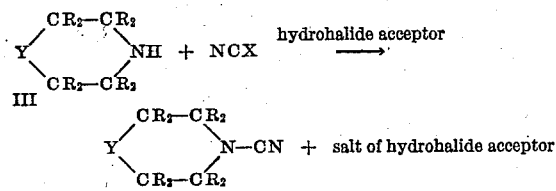

In the above equation X represents a halogen and R and Y have the same meanings as given hereinbefore with reference to Formula I.

In order that those skilled in the art better may understand how the present invention may be carried into effect, the following examples are given by way of illustration and not by way of limitation. All parts are by weight.

*Example 1*

This example illustrates the preparation N-cyanomorpholine, the formula for which is

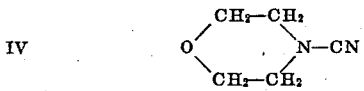

|  | Parts | Mol ratio |
|---|---|---|
| Morpholine [1] | 87.0 | 2 |
| Cyanogen bromide | 52.5 | 1 |
| Ethyl ether | 1,500.0 | |

[1] The excess of morpholine over that required for reaction with the cyanogen bromide functions as a hydrohalide acceptor.

The cyanogen bromide dissolved in one-half the above-stated amount of ethyl ether (diethyl ether) was added dropwise to a cold solution of the morpholine dissolved in the remainder (750 parts) of the ether. The solution for stirred continuously at room temperature (20–30° C.) for 4 to 5 hours during which time a white precipitate of morpholine hydrobromide formed. The precipitate was filtered off and washed with ether. (The morpholine may be recovered for reuse by regenerating with an alkali, e. g., sodium hydroxide.) The filtrate and washings were concentrated under reduced pressure, yielding 55.2 parts N-cyanomorpholine. This corresponds to 92 per cent of the theoretical yield. The N-cyanomorpholine boiled at 117–119° C. at 15 mm. pressure.

Instead of using an excess (one mol in excess of equimolecular proportions) of morpholine as a hydrohalide acceptor, other hydrophalide acceptors such as mentioned hereinbefore may be employed.

*Example 2*

N-cyanothiamorpholine, the formula for which is

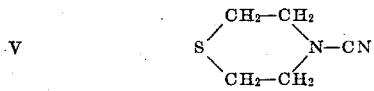

is prepared in essentially the same manner as described under Example 1 with reference to the production of N-cyanomorpholine with the exception that 103 parts thiamorpholine are used instead of 87 parts morpholine.

*Example 3*

2,6-dimethyl N-cyanomorpholine, which also may be named 2,6-dimethyl 4-cyano morpholine or 2,6-dimethyl N⁴-cyanomorpholine, the formula for which is

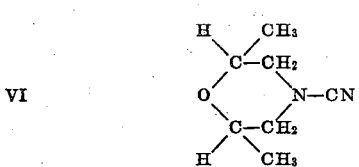

is prepared in essentially the same manner as described under Example 1 with the exception that 115 parts 2,6-dimethyl morpholine are used in place of 87 parts morpholine.

It will be readily understood by those skilled in the art from the foregoing description of the preparation of N-cyanomorpholine, N-cyanothiamorpholine and 2,6-dimethyl N-cyanomorpholine that, when it is desired to produce a morpholine having a cyano group attached directly to the nitrogen atom of the morpholine nucleus and at least one ethyl, propyl, butyl, butenyl or other alkyl or alkenyl group, or other aliphatic or other hydrocarbon substituent (e. g., an aromatic hydrocarbon radical) attached directly to at least one carbon atom of the morpholine nucleus, then the starting reactants and amounts thereof are chosen so as to yield the desired product in accordance with methods such as given above my way of illustration.

More specific examples of chemical compounds embraced by Formula I that may be produced by practicing our invention are chemical compounds corresponding to the general formula VII 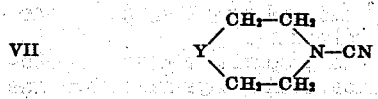

where Y is a member of the class consisting of oxygen and sulfur; and chemical compounds corresponding to the general formula:

VIII 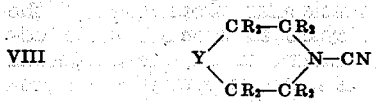

where Y is a member of the class consisting of oxygen and sulfur, and R represents a monovalent aliphatic hydrocarbon radical, e. g., an alkyl or alkenyl radical. Other specific examples are as follows:

3-ethyl 4-cyano morpholine (4-cyano 5-ethyl morpholine)
3-propyl 4-cyano morpholine (4-cyano 5-propyl morpholine)
3,5-dimethyl 4-cyano morpholine
2-methyl 4-cyano 5-isopropyl morpholine (3-isopropyl 4-cyano 6-methyl morpholine)
2-methyl 4-cyano 5-isobutyl thiamorpholine
3-propyl 4-cyano thiamorpholine (4-cyano 5-propyl thiamorpholine)
3-allyl 4-cyano 6-butyl thiamorpholine
3,3-dimethyl 4-cyano morpholine (4-cyano 5,5-dimethyl morpholine)
2-ethyl 4-cyano 5-butenyl thiamorpholine
2-amyl 3-hexyl 4-cyano 6-butenyl thiamorpholine
2-isopropyl 3-methyl 4-cyano 6-butyl thiamorpholine
2,3,5-trimethyl 4-cyano morpholine
2,3,5,6-tetraethyl 4-cyano morpholine
3-methyl 4-cyano 5-phenyl morpholine
3-allyl 4-cyano 5-cyclohexyl 6-phenyl morpholine
2-xenyl 4-cyano 6,6-ditolyl thiamorpholine
2,2,3,3,5,5,6,6-octaethyl 4-cyano morpholine
2-cinnamyl 3-methyl 4-cyano 5-cycloheptyl 6-phenyl morpholine 3-cyclohexyl 4-cyano morpholine (4-cyano 5-cyclohexyl morpholine)
2-ethylphenyl 3-benzyl 4-cyano 6-tolyl morpholine
3-phenethyl 4-cyano 5-propyl 6,6-dimethyl thiamorpholine
2-allyl 4-cyano 5-isoamyl 6-naphthyl thiamorpholine
2-allyphenyl 4-cyano 5-isoamyl 6-phenyl morpholine
2-allyl 4-cyano 5,5-dicyclohexyl 6-tolyl morpholine
3-phenylpropyl 4-cyano 6-cinnamyl morpholine
2,2-diphenyl 4-cyano 5-tolyl 6-allylphenyl thiamorpholine
2-phenyl 4-cyano morpholine (4-cyano 6-phenyl morpholine)
2,2-dibenzyl 3-allylphenyl 4-cyano 5-propylphenyl morpholine
2-methyl 3-ethyl 4-cyano 5-propyl 6-butyl morpholine
2,2-dimethyl 3,3-diethyl 4-cyano 5,5-dipropyl 6,6-dibutyl thiamorpholine
2,2-diethyl 3,3-diphenyl 4-cyano 5,5-dicyclohexyl 6,6-dipropyl morpholine
3-naphthyl 4-cyano morpholine (4-cyano 5-naphthyl morpholine)
4-cyano 5-xenyl thiamorpholine (3-xenyl 4-cyano thiamorpholine)

Specific method features of the invention include the method of preparing compositions comprising chemical compounds corresponding to the general formula IX 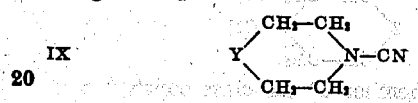

where Y is a member of the class consisting of oxygen and sulfur, said method comprising effecting reaction in the presence of a hydrohalide acceptor between (1) a compound corresponding to the general formula X 

where Y has the same meaning as given above and (2) a cyanogen halide, specifically cyanogen chloride or bromide, under the conditions hereinbefore more fully described. Our invention also provides a method of preparing N-cyanomorpholine which comprises effecting reaction between morpholine and a cyanogen halide, specifically cyanogen chloride or bromide, in the presence of a hydrohalide acceptor and isolating N-cyanomorpholine from the reaction mass. A more specific method feature of our invention is the method of preparing N-cyanomorpholine which comprises effecting reaction between morpholine and a cyanogen halide, more particularly cyanogen chloride or bromide, while the said reactants are dissolved in a solvent, the morpholine being in excess of equimolecular proportions, and separating N-cyanomorpholine, e. g., by distillation under reduced pressure, from the reaction mass.

What we claim as new and desire to secure by Letters Patent of the United States is:

1. The method of preparing an N-cyano compound corresponding to the general formula

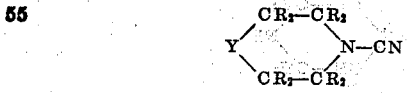

where Y is a member of the class consisting of oxygen and sulfur, and R is a member of the class consisting of hydrogen and monovalent hydrocarbon radicals, said method comprising mixing together (1) a compound corresponding to the general formula

where Y and R have the same meanings as given above and (2) a cyanogen halide in proportions corresponding to at least about two mols of the former per mol of the latter, effecting reaction between equimolecular proportions of the compounds of (1) and (2) while admixed with the amount of the compound of (1) in molar excess of the aforesaid equimolecular proportions, the said molar excess of the compound of (1) reacting with the hydrogen halide produced during the reaction between the equimolecular proportions of the compounds of (1) and (2) to form a salt of the compound of (1), and isolating the N-cyano compound from the reaction mass.

2. A method as in claim 1 wherein the cyanogen halide is cyanogen chloride.

3. A method as in claim 1 wherein the cyanogen halide is cyanogen bromide.

4. The method of preparing an N-cyano compound corresponding to the general formula

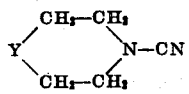

where Y is a member of the class consisting of oxygen and sulfur, said method comprising mixing together (1) a compound corresponding to the general formula

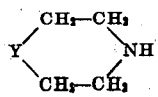

where Y has the same meaning as given above and (2) cyanogen chloride in proportions corresponding to at least about two mols of the former per mol of the latter, effecting reaction between equimolecular proportions of the compounds of (1) and (2) while admixed with the amount of the compound of (1) in molar excess of the aforesaid equimolecular proportions, the said molar excess of the compound of (1) reacting with the hydrogen chloride produced during the reaction between the equimolecular proportions of the compounds of (1) and (2) to form a salt of the compound of (1), and isolating the N-cyano compound from the reaction mass.

5. The method of preparing an N-cyano compound corresponding to the general formula

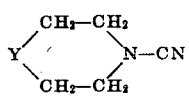

where Y is a member of the class consisting of oxygen and sulfur, said method comprising mixing together (1) a compound corresponding to the general formula

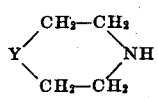

where Y has the same meaning as given above and (2) cyanogen bromide in proportions corresponding to at least about two mols of the former per mol of the latter, effecting reaction between equimolecular proportions of the compounds of (1) and (2) while admixed with the amount of the compound of (1) in molar excess of the aforesaid equimolecular proportions, the said molar excess of the compound of (1) reacting with the hydrogen bromide produced during the reaction between the equimolecular proportions of the compounds of (1) and (2) to form a salt of the compound of (1), and isolating the N-cyano compound from the reaction mass.

6. The method of preparing N-cyanomorpholine which comprises mixing together morpholine and cyanogen chloride in proportions corresponding to at least about two mols of the former per mol of the latter, allowing to react at normal temperature equimolecular proportions of the morpholine and cyanogen chloride while admixed with the amount of the morpholine in molar excess of the aforesaid equimolecular proportions, the said molar excess of morpholine reacting with the hydrogen chloride produced during the reaction between the equimolecular proportions of morpholine and cyanogen chloride to form a morpholine salt, and isolating N-cyanomorpholine from the reaction mass.

7. The method of preparing N-cyanomorpholine which comprises mixing together morpholine and cyanogen bromide in proportions corresponding to at least about two mols of the former per mol of the latter, allowing to react at normal temperature equimolecular proportions of the morpholine and cyanogen bromide while admixed with the amount of the morpholine in molar excess of the aforesaid equimolecular proportions, the said molar excess of morpholine reacting with the hydrogen bromide produced during the reaction between the equimolecular proportions of morpholine and cyanogen bromide to form a morpholine salt, and isolating N-cyanomorpholine from the reaction mass.

8. The method of preparing N-cyanomorpholine which comprises mixing together a solution of morpholine and a solution of cyanogen bromide, the said reactants being present in the mixture in proportions corresponding to at least two mols morpholine per mol cyanogen bromide, effecting reaction at 20° to 30° C. between equimolecular proportions of the dissolved morpholine and cyanogen bromide while admixed with the amount of dissolved morpholine in molar excess of the aforesaid equimolecular proportions, the said molar excess of morpholine reacting with the hydrogen bromide produced during the reaction between the equimolecular proportions of morpholine and cyanogen bromide to form a morpholine salt, and recovering N-cyanomorpholine from the reaction mass.

9. The method of preparing N-cyanomorpholine which comprises slowly adding a solution of cyanogen bromide dissolved in diethyl ether to a solution of morpholine dissolved in diethyl ether, the said reactants being present in the resulting mixture in proportions corresponding to at least two mols morpholine per mol cyanogen bromide, stirring the mixture at 20° to 30° C. for 4 to 5 hours thereby to effect reaction between equimolecular proportions of the dissolved morpholine and cyanogen bromide while admixed with the amount of dissolved morpholine in molar excess of the aforesaid equimolecular proportions, the said molar excess of morpholine reacting with the hydrogen bromide produced during the reaction between the equimolecular proportions of morpholine and cyanogen bromide to form a morpholine salt, filtering off the morpholine salt, washing the separated morpholine salt with diethyl ether, and recovering N-cyanomorpholine from the filtrate and washings.

GAETANO F. D'ALELIO.
JAMES J. PYLE.